Figure 1:
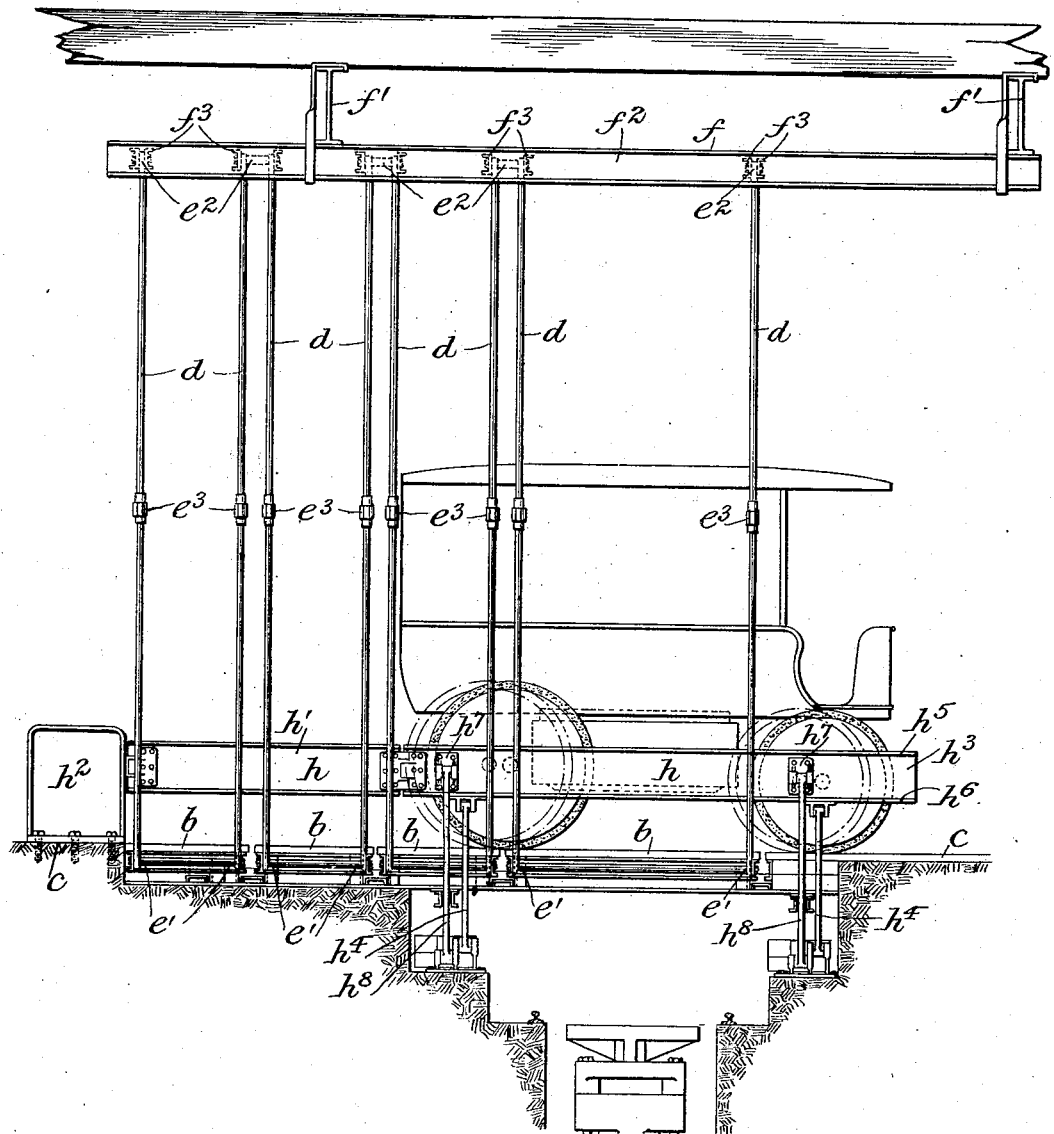

No. 755,087. PATENTED MAR. 22, 1904.
G. A. WARD.
POSITIONING APPARATUS FOR VEHICLES.
APPLICATION FILED DEC. 23, 1902.
NO MODEL. 3 SHEETS—SHEET 1.

Witnesses:
Geo. B Rowley
A. N. Jesbera

Inventor
George A. Ward
By
Redding Kiddle Greeley
Att'ys

No. 755,087. PATENTED MAR. 22, 1904.
G. A. WARD.
POSITIONING APPARATUS FOR VEHICLES.
APPLICATION FILED DEC. 23, 1902.
NO MODEL. 3 SHEETS—SHEET 2.
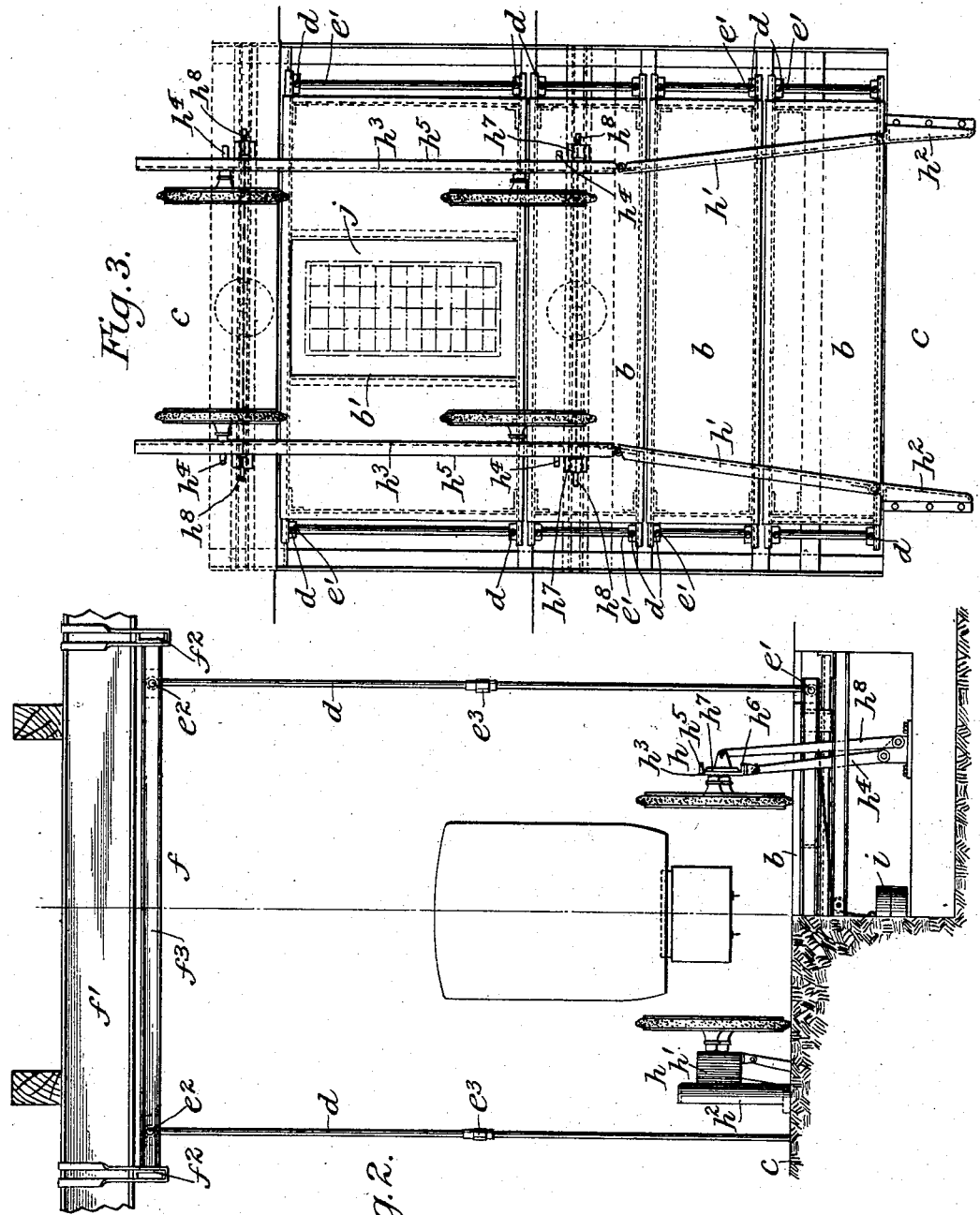

No. 755,087. PATENTED MAR. 22, 1904.
G. A. WARD.
POSITIONING APPARATUS FOR VEHICLES.
APPLICATION FILED DEC. 23, 1902.
NO MODEL. 3 SHEETS—SHEET 3.
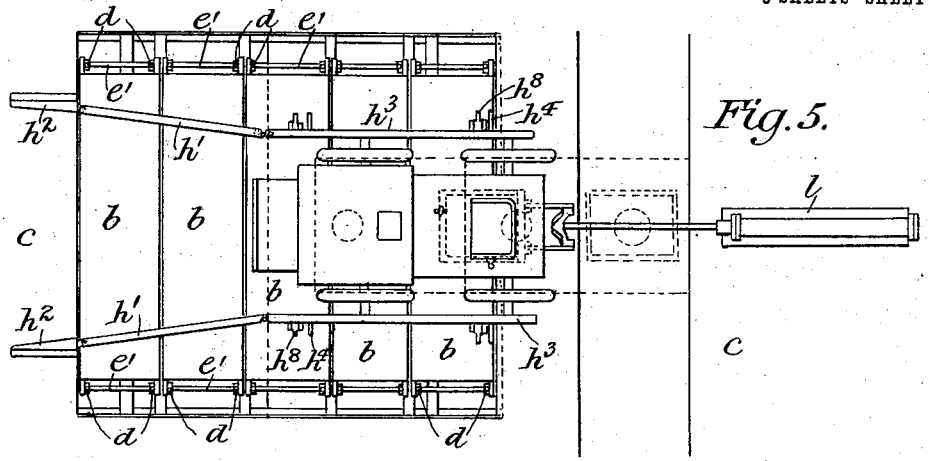
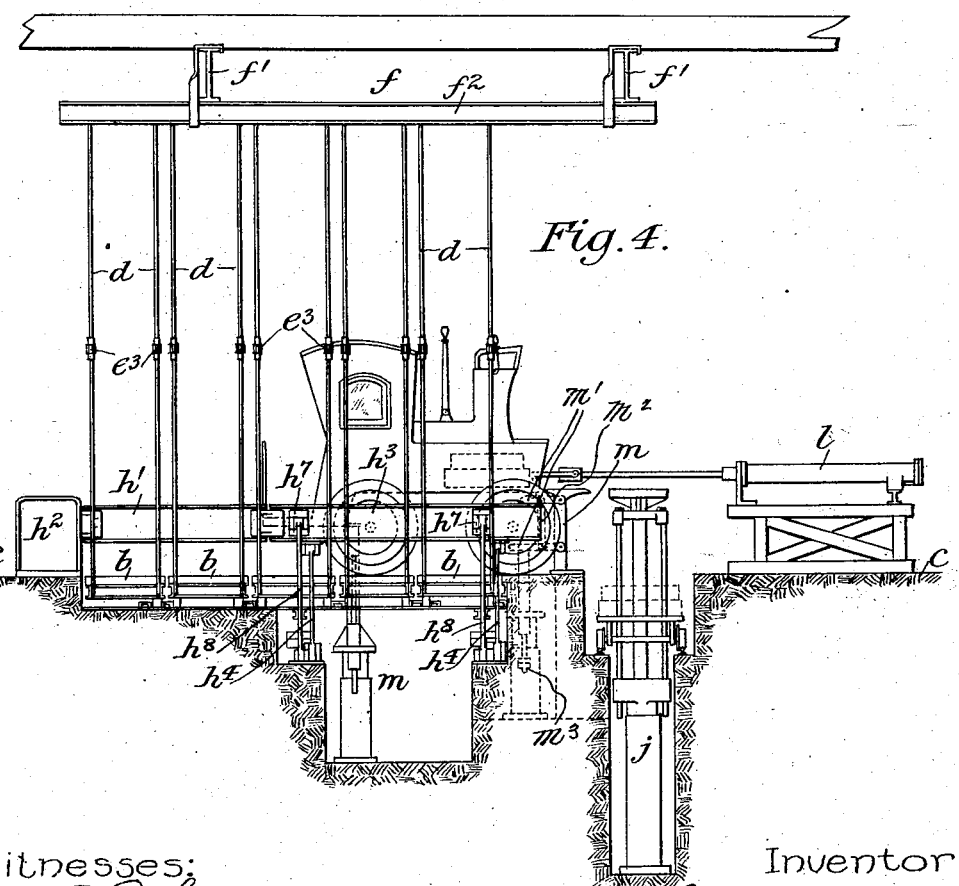
Witnesses:
Geo. B Rowley
A. N. Jesbera
Inventor
George A. Ward
By
Redding Kiddle & Greeley
Att'ys.

No. 755,087. Patented March 22, 1904.

UNITED STATES PATENT OFFICE.

GEORGE A. WARD, OF NEW YORK, N. Y., ASSIGNOR TO ELECTRIC VEHICLE COMPANY, OF JERSEY CITY, NEW JERSEY, A CORPORATION OF NEW JERSEY.

POSITIONING APPARATUS FOR VEHICLES.

SPECIFICATION forming part of Letters Patent No. 755,087, dated March 22, 1904.

Application filed December 23, 1902. Serial No. 136,317. (No model.)

*To all whom it may concern:*

Be it known that I, GEORGE A. WARD, a citizen of the United States, residing in borough of the Bronx, of the city of New York, in the State of New York, have invented certain new and useful Improvements in Positioning Apparatus for Vehicles, of which the following is a specification, reference being had to the accompanying drawings, forming a part thereof.

This invention relates to positioning apparatus for electric vehicles whereby such vehicles may be positioned or centered with respect to a stationary device for loading and unloading storage batteries therefrom. Owing to the difficulties of handling storage batteries consequent upon their great weight, various apparatuses have been devised whereby the labor incident to the frequent transfer of the batteries to and from a motor-vehicle might be reduced and an ordinarily clumsy and awkward operation rendered simple and more or less automatic.

The object of this invention is to simplify further the transfer of batteries to and from motor-vehicles, particular regard being paid to the automatic positioning or centering of the vehicle, whereby the same may not require the attention of a regular operator and whereby it shall be accomplished with the least wear upon the vehicle and especially upon the vehicle-tires.

In the accompanying drawings, Figure 1 is a side elevation of an apparatus embodying the invention, a vehicle having an underslung battery being shown positioned upon such apparatus. Fig. 2 is a rear elevation of the same, one portion of this view being extended to show the connections below the plane of the floor. Fig. 3 is a plan view of the same, the vehicle-body, however, being removed to show more clearly the construction of the platform beneath. Fig. 4 is a side elevation of the apparatus with a vehicle positioned thereon in which the battery is adapted to be removed from the rear end of the vehicle. Fig. 5 is a plan view of the same.

In accordance with the invention the positioning or centering apparatus comprises a sectional platform or table adapted to receive a vehicle, the several sections of which table are independently supported by being suspended from an overhead frame, whereby each of said sections are capable of swinging in a lateral direction and independently of the other sections. The sections of the platform are indicated at $b$, the plane of the table formed by these several sections being, preferably, horizontal and level with the floor $c$ of the room in which the apparatus is installed. The several sections $b$ are preferably of the same length; but the width of the same may be made to vary to suit the particular conditions of use to which the apparatus is to be applied. There may be as many of these sectional platforms as are necessary to form a table of the desired dimensions, and said platforms are severally supported on each side by suspension-rods $d$, these rods being pivoted to the ends of said sections at $e'$ and to an overhead or supporting frame $f$ at $e^2$, whereby each section of the platform is permitted to have a free lateral swing. Adjusting-links $e^3$ may be provided upon said suspension-rods in order to furnish means for varying the lengths of these rods as circumstances may require. The frame $f$ may be of any suitable form or construction, but preferably comprises I-beams $f'$, which may be secured to the floor-beams overhead, side beams $f^2$, clamped thereto, and cross beams or supports $f^3$, in which the upper ends of the suspension-rods are pivoted.

Centrally arranged above the platform at a suitable distance so as to engage, preferably, the hubs of the vehicles is a vehicle guiding or directing frame $h$, of which the lateral guide-bars $h'$, one on each side, are disposed obliquely with respect to each other. At one end these guide-bars are secured by hinges to stationary parts $h^2$, respectively, of said guide-frame $h$, which stationary parts are bolted to the floor, while the other ends of said obliquely-disposed guide-bars are hinged, respectively, to parallel guide-bars $h^3$ of said guide-frame $h$, which latter bars are yieldingly supported upon rock-arms $h^4$. Said guide-bars $h^3$ are provided with outwardly-projecting flanges $h^5$ and $h^6$, between which blocks $h^7$ are placed, which blocks are carried by pivoted arms $h^8$. Means, such as weights $i$, operatively connected with each pair of pivoted arms $h^8$, are provided in order to cause blocks $h^7$ to force inwardly at all times the guide-bars $h^3$, whereby said bars are adapted to impart a yielding pressure upon a vehicle between them. In the movement of the guide-bars $h^3$ the flanges $h^5$ and $h^6$ will be engaged by the blocks $h^7$, respectively, and will determine the limit of lateral movement in each direction of said guide-bars.

Centrally placed with respect to the guide-frame $h$ is a stationary loading and unloading device $j$, which may comprise a hydraulic elevator or any other suitable form of mechanism for effecting the raising and lowering of the storage batteries. In vehicles carrying an underslung battery, which type of vehicle is illustrated in Figs. 1 and 3, this stationary battery-handling device will be located either underneath the centering-table or below the floor in advance of said table. Where it is placed underneath the positioning-table, the sectional platform directly over the same is made of a sufficient width and is provided with an opening $b'$ to permit the battery to be passed up and down therethrough. Vehicles in which the batteries are adapted to be slid in and out of the vehicle-body will be loaded, preferably, from a battery-elevator positioned below the floor in advance of the positioning table or platform, as shown in Figs. 5 and 6, a ram $l$ being provided to shove the batteries in and out. While the vehicles are being loaded, and especially in cases of vehicles loaded in the latter-mentioned way, a locking device $m$ is provided to secure the vehicle firmly in position while the loading and unloading is taking place. In Fig. 4 of the drawings two such locking devices are indicated, one for the rear and one for the forward end of the vehicle. The form of these locking devices is obviously immaterial. In the present case the locking device for the rear of the vehicle is provided with arms $m'$, hinged to the post marked $m$, said arms being joined by a bar $m^2$, which is pivoted to each arm. A ram $m^3$ (indicated in dotted lines) is operatively connected with said arms. When the vehicle is backed onto a platform, the rear axle is received between the two arms $m'$ and is stopped at the proper point. By operating the ram the vehicle may now be raised, if necessary, to bring the battery-compartment to the desired level. The locking device for the front end of the vehicle, which may be dispensed with, if desired, may also comprise a ram, as indicated, and suitable means connected with the ram for engaging the sill of the vehicle.

When a vehicle is to be positioned or centered by the above-described apparatus, it is driven upon the positioning-platform from the end at which the obliquely-disposed guide-bars are arranged and into the space between said guide-bars. As will be obvious, if the vehicle is not exactly centered with respect to the guide-frame as it moves upon the sectional platforms the forward end of the same will strike one or the other of the obliquely-disposed guide-bars, whereby lateral pressure will be imparted to the vehicle from one side or the other and will cause one or more of the sectional platforms upon which the forward part of the vehicle rests to swing in the proper direction to center that portion of the vehicle. Likewise the rear end of the vehicle will be centered so that when the vehicle reaches and is located between the parallel guide-bars it will be substantially centered with respect to that portion of the table or to those sections of the table upon which it rests, provided the guide-frame is centrally placed with respect to the table. It will be obvious, however, that so far as the loading and unloading of the batteries are concerned it is only required that the centering of the vehicle shall be done with respect to the stationary loading device—that is, a point outside the table—and the invention is accordingly not limited to an apparatus for centering the vehicle with respect to the positioning or centering table or platforms. It will also be obvious that the vehicle may be centered and then run off the table or platforms, the loading being done at a point considerably in advance of the table or platforms which serves as before to center the vehicle with respect to the loading device.

I claim as my invention—

1. In a positioning apparatus for vehicles, the combination of freely-swinging platforms suspended from above by upwardly-extending members and forming a table adapted to receive a vehicle, and a guide-frame coöperating therewith to center the vehicle with respect to a fixed point outside of the table.

2. In a positioning apparatus for vehicles, the combination of freely and laterally moving platforms hung on suspenders swinging freely from above and forming a table adapted to receive a vehicle, and yieldingly-suspended guide-bars coöperating therewith to center the vehicle with respect to a fixed point outside of the table.

3. In a positioning apparatus for vehicles, the combination of independent and laterally-swinging platforms forming a table to receive a vehicle, and obliquely-disposed lateral guide-bars coöperating with certain of said platforms to center the vehicle on the remaining of said platforms.

4. In a positioning apparatus for vehicles, the combination of independent and laterally-swinging platforms forming a table to receive a vehicle, and obliquely-disposed lateral guide-bars which are yieldingly supported coöperating with certain of said platforms to center the vehicle on the remaining of said platforms.

5. In a positioning apparatus for vehicles, the combination of independent and laterally-swinging platforms forming a table to receive a vehicle, obliquely-disposed lateral guide-bars coöperating with certain of the platforms to center the vehicle, and parallel guide-bars for retaining the vehicle in its central position on the remaining of said platforms.

6. In a positioning apparatus for vehicles, the combination of independent and laterally-swinging platforms forming a table to receive a vehicle, and a frame for guiding or directing the vehicle, said frame being centrally placed with respect to said table.

7. The combination with a stationary loading and unloading device, of a vehicle-positioning apparatus comprising freely-swinging platforms forming a table adapted to receive a vehicle, and a yieldingly-supported guide-frame coöperating therewith, said frame being centrally placed with respect to said loading and unloading device.

8. The combination with a stationary loading and unloading device, of a vehicle-positioning apparatus comprising independent and laterally-swinging platforms forming a table to receive a vehicle, and obliquely-disposed lateral guide-bars coöperating with certain of said platforms to center the vehicle with respect to said loading and unloading device.

9. In a positioning apparatus for vehicles, the combination of suspended platforms arranged side by side and forming a table adapted to receive a vehicle, a supporting-frame therefor, suspension-rods pivoted to said platforms and frame, and guide-bars coöperating with said platform to center the vehicle with respect to a fixed point outside said table.

This specification signed and witnessed this 22d day of December, A. D. 1902.

GEORGE A. WARD.

In presence of—
CHAS. S. BONNOR,
CARL NIENDORFF.